July 22, 1947. W. R. P. DELANO 2,424,268
HUMIDIFIER
Filed April 15, 1944
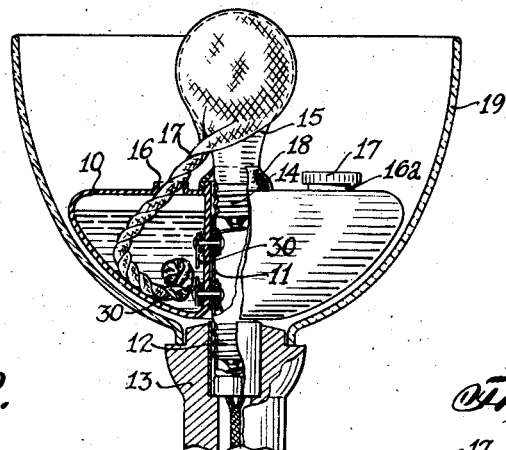
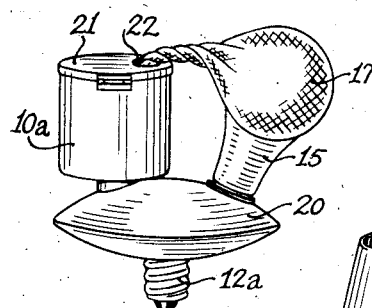
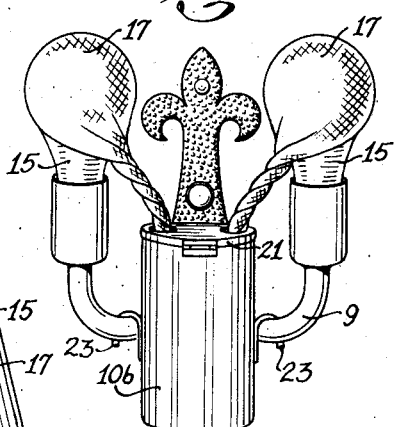
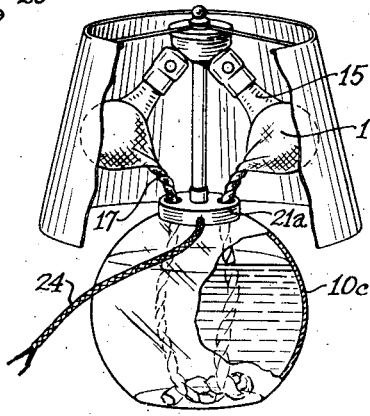
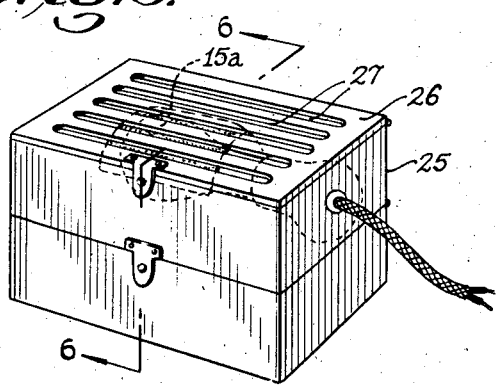
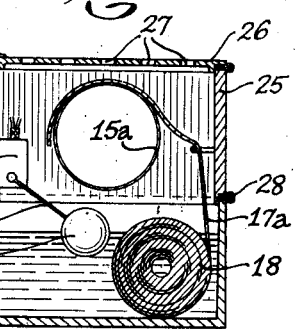
INVENTOR
WILLIAM R. P. DELANO
BY Worth Wade
ATTORNEY Patented July 22, 1947

2,424,268

UNITED STATES PATENT OFFICE 2,424,268

HUMIDIFIER

William R. P. Delano, New York, N. Y., assignor to Richard Delano, Inc., Setauket, N. Y., a corporation of New York Application April 15, 1944, Serial No. 531,270

6 Claims. (Cl. 219—45)

This invention relates in general to humidifiers and in particular to a simple apparatus for humidifying air.

It is characteristic of rooms heated by means of radiators or direct fired stoves that the heat, being unaccompanied by any supplied moisture, gradually dries out the air in the room and thus water is slowly evaporated from furniture, books, the skin, and other objects that may be in the room, with deleterious effects. On the other hand, it is well known that during the winter months the atmosphere contains less moisture than in other seasons and this deficiency frequently gives rise to chapping of the skin, drying of the mucous membrane, as well as causing evaporation of moisture from various objects.

It has been proposed to equip buildings and industrial plants with humidifiers of various types for conditioning the air, but most of the industrial humidifiers and air conditioning units are characterized by being (a) extremely expensive, (b) requiring complicated equipment or (c) requiring a large water supply so that the industrial humidifiers heretofore devised are not applicable for air conditioning small rooms or chambers in a simple and inexpensive manner.

Some attempts have been made, unsuccessfully, to use an electric light as a source of heat in portable humidifiers, but these prior devices have, inter alia, the following disadvantages: The light has been enclosed in a secondary container, thus obscuring the light and preventing its use for illumination. The wick has been placed on the outside of the secondary container and not in direct contact with the bulb so that heating efficiency is seriously reduced; the water reservoir surrounds the bulb so that the wick contacts only a fraction of the bulb surface, thus reducing very materially the amount of water evaporated.

Therefore, it is a general object of the present invention to provide a simple and inexpensive portable device for humidifying air which will be free of the defects and disadvantages of prior devices.

It is a specific object of the invention to provide means for humidifying air by using conventional heating elements which are normally available in residences and industrial establishments.

It is a further object to provide a combined light source and humidifier.

Other objects of the invention will in part be obvious and will in part be described hereinafter.

According to the present invention, there is provided a portable humidifier and light source comprising, the combination of, a liquid container, an electric lamp positioned free of the container, a wick of fibrous material having one end extending in the liquid in the container and the other end in direct contact with the lamp whereby the wick is heated to evaporate liquid therefrom without materially reducing the illumination.

In one embodiment of the invention there is provided a combined electric lamp and liquid container having a threaded end adapted to be screwed into a conventional electric light socket and a fibrous wick extending from within said container and over the electric lamp.

In another embodiment there is provided a liquid container having a threaded end adapted to be screwed into a conventional electric light socket and one wick or more extending from said container and adapted to be disposed over one or more adjacent electric lamps.

In another embodiment there is provided a combined humidifier and table lamp having a liquid reservoir in the base thereof, and one or more wicks extending from said reservoir and adapted to be disposed over one or more electric bulbs of the lamp.

All of the above embodiments are characterized by a combination of functionally important features, namely, (a) the wick is in direct contact with the major portion of the surface of the lamp; (b) the liquid reservoir is positioned either below or at one side of the lamp so as not to obscure the light or reduce the surface area of the lamp which may be contacted by the wick; (c) and, in the preferred forms of these embodiments, the length of the wick is greater than that necessary to reach from the liquid to the lamp, so that the wick may be renewed by cutting off the soiled top portion as needed; and (d) the wick is preferably tubular and knitted so that it can conform and contact a large area of the lamp.

In another embodiment there is provided a humidifier comprising a liquid reservoir, a web of fibrous material arranged and adapted to pass through the liquid in such container, a resistance-type electric heating element positioned adjacent the reservoir, and means to pass the said fibrous web in position to be heated by the heating element whereby water is evaporated from the web.

For a more complete understanding of the nature and objects of the invention, reference should be had to the accompanying drawing in which Fig. 1 is a side elevation, partly in section, of a portable humidifying device for use in connection with standard table and floor lamps;

Fig. 2 is a perspective view of one embodiment of a portable humidifier for use in connection with electric lamps;

Fig. 3 is a perspective view of another embodiment of the humidifier adapted to be used in connection with bracket lamps;

Fig. 4 is a side elevation, partly in section, of a combined table lamp and humidifier in accordance with one embodiment of the present invention;

Fig. 5 is a perspective view of a portable humidifying apparatus in accordance with a further embodiment; and Fig. 6 is a cross-section of the device of Fig. 5 taken along the line 6—6 thereof.

It should be understood that the heat source employed in the humidifier of the present invention may be any suitable device, but preferably is an electrical resistance-heating element, such, for example, as an electric light bulb, an infra-red light bulb, an ultraviolet lamp, and the like. However, the invention is not limited to the use of electrical heating sources since the humidifier may employ any heating or lighting device utilizing oil, gas, alcohol, and the like. For example, the wick of the present humidifier may extend over or be placed in contact with the chimney of an oil lamp or lantern. "Lamp" is used in the claims in a generic sense.

The liquid reservoir of the present invention is usually small and portable but the invention does not preclude the use of reservoirs which are continuously fed with water from a prime source. The reservoir may be of any desired configuration, rectangular, round, cylindrical or spherical, and it is preferably positioned adjacent to, or under the lamp bulb so as not to materially reduce the illumination. As a practical matter, the liquid reservoir may be a separate vessel, a vase, a lamp base, or a household utensil, and may therefore serve a dual purpose. The invention also includes the use of a plurality of small liquid reservoirs fed from a syphon or otherwise from a common larger reservoir. The liquid reservoir may be separate from or affixed to the lamp.

For the wick there may be employed any suitable fibrous material, such, for example, as a paper, felt, or fabric made by weaving, knitting, braiding, netting and the like but it is preferably a tubular knitted member. The fibres in the paper, felt or fabric may be natural or synthetic fibres and where heat resistance is required, the paper, felt or fabric may be formed of siliceous fibres, such as glass, mineral wool, or asbestos fibres in whole or in part. The fibrous material may comprise staple fibres and/or continuous filaments and may have any suitable configuration, that is, the wick may be flat, round or tubular. In the now preferred embodiment the wick is formed of a tubular knitted fabric which is adapted to be stretched over any common heating or lighting fixture. The wick may be a discontinuous piece of fibrous material or it may be in the form of a more or less continuous web, the web being positioned so as to pass into contact with the liquid prior to being heated.

By way of illustrating but not by way of limiting the invention, there will be shown and described a number of embodiments of the humidifier.

In the embodiment shown in Fig. 1, there is provided a liquid reservoir 10 which surrounds a cylinder 11 having a threaded end 12 adapted to fit into a conventional light socket 13, the upper end of the cylinder 11 having threads adapted to receive the threaded end 14 of an electric light bulb 15. In the top of the liquid reservoir is an opening 16 through which a wick 17 of fibrous material may pass, the wick extending from the liquid in the reservoir up to and over the top of the bulb 15. There is also provided a second opening 16a having a cap 17 through which liquid may be introduced into the reservoir 10. To avoid dripping of water from the wick 17 into the electrical connections at the base of the bulb 15, there may be provided a rubber gasket or collar 18 which surrounds the base of the bulb 15. It should be noted that the reservoir and the enclosed cylinder 11 may be sold and marketed as a separate unit since it is adapted to fit into a conventional electric light socket and to receive a conventional electric light bulb. In the particular embodiment shown in Fig. 1, the reservoir is conical-shaped on the bottom so that it may nestle in the base of a reflector ball 19 for a table or floor lamp. It is to be understood, however, that the device comprising the reservoir 10, the wick 17 and the bulb 15 may be used independent of any lighting fixture.

In that embodiment shown in Fig. 2, the reservoir 10a has a threaded end 12a adapted to be fitted into a standard electric light socket while the electric bulb is adapted to be fitted into a second socket adjacent thereto, and the wick 17 extends from the reservoir and covers the top of the adjacent bulb 15, the base unit 20 having a threaded end 12a adapted to fit any standard electric lamp socket. In this embodiment, the reservoir 10a is provided with a hinged cover 21 having a hole 22 therein through which the wick passes.

In that embodiment shown in Fig. 3, a single liquid reservoir 10b is employed in conjunction with a plurality of heating units, such as the electric light bulb 15. In the device illustrated in Fig. 3, the reservoir is adapted to be fitted to a wall bracket 9 and may be supported thereon by means of the hooks 23 fixed to the sides of the container 10b. The hinged lid 21 is provided with a plurality of holes through which the wicks 17 pass and cover the respective bulbs 15.

In that embodiment shown in Fig. 4, the liquid reservoir 10c comprises the lampbase, the base being fitted with a cap 21a provided with one or more holes through which wicks 17 pass upward and cover the lamp bulbs 15. The electric wiring 24 preferably passes directly through the lid 21a so that it does not come in contact with the liquid carried by the wicks. If the lamp base, which serves as a reservoir 10c, is transparent, the liquid may be advantageously colored to give a pleasing decorative effect.

In all of the embodiments heretofore described, the heating source has been illustrated by use of an electric light bulb. In all such embodiments the bulb serves a dual function of causing the evaporation of the water from the wick to increase the humidity of the atmosphere and also as a light source, since even with wicks formed of relatively opaque yarns, the light is not materially reduced by the presence of the wick. However, it should be understood that the invention is not limited to the use of a heating element which is also a light source. Therefore, in the embodiment shown in Fig. 5, the heating element may be a black lamp bulb 15a which is enclosed in the upper part of a box 25 having a hinged top 26 provided with a plurality of slits 27 to permit the passage of water vapor. The lower part of the box 25 is adapted to hold water and serves therefore as the liquid reservoir. To permit refilling the lower section with water the box may be divided lengthwise and a hinge 28 provided so that the box may be opened, filling the lower section with water. In this embodiment the wick 17a comprises a substantially continuous web of liquid absorbent material. The web may be wound into a roll 18 and the roll allowed to rest on the bottom of the container more or less submerged in the liquid, the free end of the web 17a passing up and over the heating unit 15a. The embodiment shown in Figs. 5 and 6 provides a simple portable humidifying apparatus, in which the bulb 15a is used solely for the evaporation of water from the wick 17a. When the wick becomes soiled from the collection of dust and is otherwise deteriorated by the heat, the lid 26 may be opened and a fresh section of the web 17a drawn over the bulb 15a.

When the wick is not made of a heat-resisting material such, for example, as asbestos, glass fibres and the like, the charring of the wick when the liquid in the reservoir has become exhausted may be prevented by providing an aquastat which will function to disconnect the heating element 15 when the water level in the reservoir has dropped below a predetermined level. For example, there is shown in Fig. 1 a circuit breaker comprising the poles 30 which are disposed in the interior of the liquid reservoir 10 so that there is a gap between the poles. If a small amount of an electrolyte, such as common table salt, is added to the water when the water level drops below the upper pole 30, the electric circuit will be broken and the lamp turned off. In Fig. 6 there is illustrated a second embodiment of a circuit breaker comprising a float 31 fixed to the end of a lever 32, the opposite end serving to throw a switch in the box 33 to break the electric circuit when the water in the box 25 has dropped below a predetermined level. It is to be understood that any other conventional means may be employed for shutting off the heating element when the water level has dropped to a predetermined point. When such devices are employed, the wick may be made of any material which will normally char if exposed to the heating source when dry.

While the invention is particularly adapted for conditioning rooms with respect to humidity, the device may likewise serve to sterilize the air in chambers by adding to the liquid in the reservoir a volatile germicide such, for example, as chloramine-T, hexyl resorcinol, phenyl ethyl resorcinol, phenol, cresol, and volatile aldehydes, in particular formaldehyde. In this case the heat will not only cause the evaporation of water but also the volatilization of the germicides.

The device of the present invention may also be used for purifying air with respect to odors, in which case there may be added to the liquid in the reservoir activated chlorophyll which serves to eliminate unpleasant odors from bathrooms, smoke-filled rooms, kitchens, and warehouses. Also, there may be added to the reservoir perfumes and essences for imparting pleasant odors to the humidified air.

Thus, there has been provided by the present invention, a simple, inexpensive device for humidifying and conditioning air, which is readily adapted to be used with heating elements available in the common household, or in stores, warehouses, refrigeration plants, tobacco factories and other industrial esablishments. Since the device is portable and the wicks readily replaceable, the device can be placed in operation and discontinued with a minimum of trouble. Moreover, in the place of table and floor lamps, the humidifier is substantially unnoticeable and does not detract from the appearance of such light fixtures. Further, the device does not require a continuous supply of water and does not require any moving parts, such as motors, fans and the like.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In a combined humidifier and light source, the combination of a lamp adapted to generate heat, a liquid container arranged and positioned not to obstruct light from said lamp, a wick of fibrous material having one end extending in the liquid in said container and the other end in direct contact with said lamp whereby liquid drawn from said container through said wick will be evaporated by the heat from said lamp without materially reducing the illumination therefrom, said wick having a length greater than that necessary to extend from the liquid in said container to said lamp so that the wick may be renewed by cutting off the top portion as required.

2. The combination of an electric lamp having an elongated base provided with threads on the lower end thereof, a liquid container surrounding said elongated base and a wick of fibrous material having one end extending in the liquid in said container and the other end in direct contact with said lamp whereby liquid drawn from said container through said wick will be evaporated by the heat from said lamp without materially reducing the illumination therefrom.

3. The combination of an adapter having a threaded post adapted to be screwed into a conventional electric light socket and two threaded recesses adapted to receive electric fixtures positioned in the top of said adapter, an electric lamp screwed into one of said recesses, a liquid container having a threaded base and screwed into said other recess, and a wick of fibrous material having one end extending in the liquid in said container and the other end in direct contact with said lamp whereby liquid drawn from said container through said wick will be evaporated by the heat from said lamp without materially reducing the illumination therefrom.

4. The combination of a liquid container having a threaded end adapted to be screwed into a conventional electric light socket, and a wick of fibrous material having one end extending in the liquid of said container and the other end adapted to be disposed on the surface of an adjacent electric light bulb.

5. In an apparatus as recited in claim 1, in which the fibrous wick comprises a tubular knitted fabric.

6. An apparatus as recited in claim 1 in which the fibrous wick comprises a substantially endless web of fibrous material.

WILLIAM R. P. DELANO.

REFERENCES CITED

The following references are of record in the file of this patent:

UNITED STATES PATENTS

| Number | Name | Date |
|---|---|---|
| 1,522,755 | Soreng et al. | Jan. 13, 1925 |
| 2,152,466 | Clyne | Mar. 28, 1939 |
| 1,601,097 | Alanson | Sept. 28, 1926 |
| 1,544,212 | Blaschke | June 30, 1925 |
| 1,727,899 | Odlum | Sept. 10, 1929 |
| 1,732,674 | Dever | Oct. 22, 1929 |
| 1,867,064 | Dever | July 12, 1932 |
| 2,124,543 | Clyne | July 26, 1938 |